US012779507B2

(12) United States Patent
Christopher

(10) Patent No.: US 12,779,507 B2
(45) Date of Patent: *Nov. 3, 2026

(54) MOBILE WASHING AND DETAILING SYSTEMS

(71) Applicant: Primo IP Holder, LLC, Bonita Springs, FL (US)

(72) Inventor: Jonathan Christopher, Estero, FL (US)

(73) Assignee: Primo IP Holder, LLC, Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/916,315

(22) Filed: Oct. 15, 2024

(65) Prior Publication Data

US 2025/0214118 A1 Jul. 3, 2025

Related U.S. Application Data

(63) Continuation of application No. 17/406,942, filed on Aug. 19, 2021, now Pat. No. 12,128,453.

(Continued)

(51) Int. Cl.
*B08B 3/02* (2006.01)
*B05B 9/04* (2006.01)
(Continued)

(52) U.S. Cl.
CPC ............ *B08B 3/026* (2013.01); *B05B 9/0403* (2013.01); *B05B 9/0423* (2013.01);
(Continued)

(58) Field of Classification Search
CPC ............ B08B 3/026; B08B 2203/0205; B08B 2203/027; B08B 2203/0276; B05B 15/40;
(Continued)

(56) References Cited

U.S. PATENT DOCUMENTS 3,380,658 A * 4/1968 Swan et al. ............ B60S 3/044 134/40
4,862,551 A * 9/1989 Martinez ............ A47L 11/4011 15/340.1

(Continued)

OTHER PUBLICATIONS

Adam's Polishes, Adam's Portable Spotless Water Deionizers, Basic, https://adamspolishes.com/products/adams-portable-spotless-water-deionizer?variant+40529981735009, Jun. 20, 2024 (13 pp.).

(Continued)

*Primary Examiner* — Tinsae B Ayalew
(74) *Attorney, Agent, or Firm* — Nixon Peabody LLP

(57) ABSTRACT

A system includes a frame, a spot-free water generator, a booster pump, a tank, a first pressure washer, and a first on-demand pump. The frame is configured to be received within and coupled to a portion of an interior of a vehicle. The spot-free water generator includes a carbon filter, a pre-filter, and a plurality of membranes and is configured to generate spot-free rinse water from tap water. The booster pump receives tap water from an exterior water inlet port and delivers the tap water to the spot-free water generator at a predetermined pressure. The tank is coupled to the frame and receives and stores at least a portion of the spot-free rinse water generated by the spot-free water generator. The first on-demand pump is coupled to the frame and is configured to deliver spot-free rinse water from the tank to the first pressure washer.

20 Claims, 7 Drawing Sheets

Related U.S. Application Data

(60) Provisional application No. 63/084,938, filed on Sep. 29, 2020.

(51) Int. Cl.

| | |
|---|---|
| ***B05B 12/08*** | (2006.01) |
| ***B05B 13/00*** | (2006.01) |
| ***B05B 15/40*** | (2018.01) |
| ***C02F 9/00*** | (2023.01) |
| *C02F 1/00* | (2023.01) |
| *C02F 1/44* | (2023.01) |
| *C02F 101/12* | (2006.01) |

(52) U.S. Cl.

CPC .......... *B05B 12/081* (2013.01); *B05B 13/005* (2013.01); *B05B 15/40* (2018.02); *C02F 9/00* (2013.01); *B08B 2203/0205* (2013.01); *B08B 2203/027* (2013.01); *B08B 2203/0276* (2013.01); *C02F 1/001* (2013.01); *C02F 1/44* (2013.01); *C02F 2101/12* (2013.01); *C02F 2201/005* (2013.01); *C02F 2201/008* (2013.01); *C02F 2301/046* (2013.01); *C02F 2301/066* (2013.01)

(58) Field of Classification Search

CPC ... B05B 9/0403; B05B 9/0423; B05B 12/081; B05B 13/005; C02F 9/00; C02F 1/001; C02F 1/44; C02F 2101/12; C02F 2201/005; C02F 2201/008; C02F 2301/046; C02F 2301/066

USPC .......................................................... 134/198

See application file for complete search history.

(56) References Cited

U.S. PATENT DOCUMENTS

| | | | | |
|---|---|---|---|---|
| 2003/0230522 | A1* | 12/2003 | Pavel ..................... | B01D 61/08 210/259 |
| 2013/0081715 | A1 | 4/2013 | Mccormick et al. | |
| 2020/0208766 | A1 | 7/2020 | Greco et al. | |

OTHER PUBLICATIONS

Adam's Polishes, Adam's Portable Spotless Water Deionizers, Standard, https://adamspolishes.com/products/adams-portable-spotless-water-deionizer?variant=32581712609377, Jun. 20, 2024 (13 pp.).

Adam's Polishes, Adam's Portable Spotless Water Deionizers, Delux, https://adamspolishes.com/products/adams-portable-spotless-water-deionizer?variant=41136068853857, Jun. 20, 2024 (13 pp.).

Adam's Polishes, Adam's Portable Spotless Water Deionizers, Pro, https://adamspolishes.com/products/adams-portable-spotless-water-deionizer?variant=39418128433249, Jun. 20, 2024 (13 pp.).

Waterdrop Spotless Car Wash System With Resin Instruction Manual (6 pp.).

Spotless Water Systems, DIC-20 (High Output), https://crspotless.com/products/dic-20-high-output?gad_source=1&gclid=EAlalQobChMI3pvY1P7qhgMVuzYIBRu8gzWEAAYASAAEgJJR_D_BWE Jun. 20, 2024 (1 p.).

Spotless Water Systems Instruction Guide (2 pp.).

36 GPD Membrane, https://shop.spotfreesystem.com/products/36-gpd-membrane, 2024, Martin Water Conditioning-Spot Free (2 pp.).

36 GPD Spot Free Car Rinse System With a 30 Gallon Storage Tank, https://shop.spotfreesystem.com/products/35-gpd-spot-free-car-rinse-system, 2024, Martin Water Conditioning Spot Free (3pp.).

75 GPD Large Capacity Spot Free Car Rinse Systems With a 75 Gallon Storage Tank, https://shop.spotfreesystem.com/products/75-gpd-large-capacity-spot-free-car-rinse-system, 2024, Martin Water Conditioning-Spot Free (3 pp.).

Inlet Water Booster Pump, https://shop.spotfreesystem.com/products/inlet-water-booster-pump, 2024, Martin Water Conditioning-Spot Free (2 pp.).

Omnipure K2533JJ 10" Carbon Inlne Water Filter, https://shop.spotfreesystem.com/products/omnipure-k2540j-10-carbon-inline-water-filter, 2024, Martin Water Conditioning-Spot Free (2 pp.).

Well Water Prefilter, https://shop.spotfreesystem.com/products/well-water-prefilter, 2024, Martin Water Conditioning-Spot Free (2 pp.).

Waterdrop, Waterdrop Spotless Car Wash System With Resin, https://www.waterdropfilter.com/products/waterdrop-spotless-car-wash-system-with-resin?gad_source=1 &gclid=EAlalQobChMliqfCnP7qhgMVV09HAR2I RQZAEAAYASAFEgK-QPD_BWE, Jun. 20, 2024 (1 p.).

Coastal Water Filters, Inc., Ozmosis, Commercial RO Reverse Osmosis Membrane Systems Installation Instructions & Owner's Manual, 2023, https://www.coastalwatertechnologies.com/document-library (16 pp.).

Coastal Water Filters, Inc., Ozmosis, Membrane Spec-Sheet-Compilation, https://www.coastalwatertechnologies.com/document-library (37 pp.).

Coastal Water Filters, Inc., Ozmosis, RO Installation Diagram, https://www.coastalwatertechnologies.com/document-library (1 pg.).

Coastal Water Filters, Inc., Reverse Ozmosis Plumbing Flow Chart, https://www.coastalwatertechnologies.com/document-library (1 pg.).

* cited by examiner

MOBILE WASHING AND DETAILING SYSTEMS

CROSS-REFERENCE TO RELATED APPLICATIONS

This application is a continuation of U.S. patent application Ser. No. 17/406,942, filed on Aug. 19, 2021, now allowed, which claims the benefit of, and priority to, U.S. Provisional Patent Application No. 63/084,938, filed on Sep. 29, 2020, each of which is hereby incorporated by reference herein in its entirety.

TECHNICAL FIELD

The present disclosure relates generally to washing systems, and more particularly, to mobile washing systems including a spot-free water generator.

BACKGROUND

Vehicle detailing services generally can include exterior detailing services (e.g., exterior wash, pressure washing, soft washing, waxing, wheel cleaning, window cleaning, undercarriage cleaning, sealants, etc.), interior detailing services, (e.g., vacuuming, carpet cleaning, leather cleaning, window cleaning, etc.), or both for various vehicles (e.g., cars, ceramic-coated cars, trucks, boats, etc.). These services can be rendered at, for example, a car wash that has all of the necessary equipment. Mobile washing (e.g., detailing) services bring the services to the vehicle (instead of the other way around). That is, a user or operator travels to the vehicle(s) to be detailed that is at a location other than a car wash. However, it is difficult, and in some cases impossible, for the operator to bring the equipment that would normally be used at a car wash. For example, car washes often use spot-free rinse water systems that can reduce or altogether obviate the need to dry the vehicle to avoid hard water spots or stains. Using spot-free rinse water can cut the time needed to detail a vehicle in half. However, complicated spot-free water systems and the other associated equipment (e.g., pressure washers, vacuums, etc.) are generally not mobile and therefore not feasible for mobile detailing. The present disclosure is directed to solving these and other problems.

SUMMARY

According to some implementations of the present disclosure, a system includes a frame, a spot-free water generator, a booster pump, a tank, a first pressure washer, and a first on-demand pump. The frame is configured to be received within and coupled to a portion of an interior of a vehicle. The spot-free water generator includes a carbon filter, a pre-filter, and a plurality of membranes and is configured to generate spot-free rinse water from tap water. The booster pump receives tap water from an exterior water inlet port and delivers the tap water to the spot-free water generator at a predetermined pressure. The tank is coupled to the frame and receives and stores at least a portion of the spot-free rinse water generated by the spot-free water generator. The first on-demand pump is coupled to the frame and is configured to deliver spot-free rinse water from the tank to the first pressure washer.

The above summary is not intended to represent each implementation or every aspect of the present disclosure. Additional features and benefits of the present disclosure are apparent from the detailed description and figures set forth below.

Figure 1:
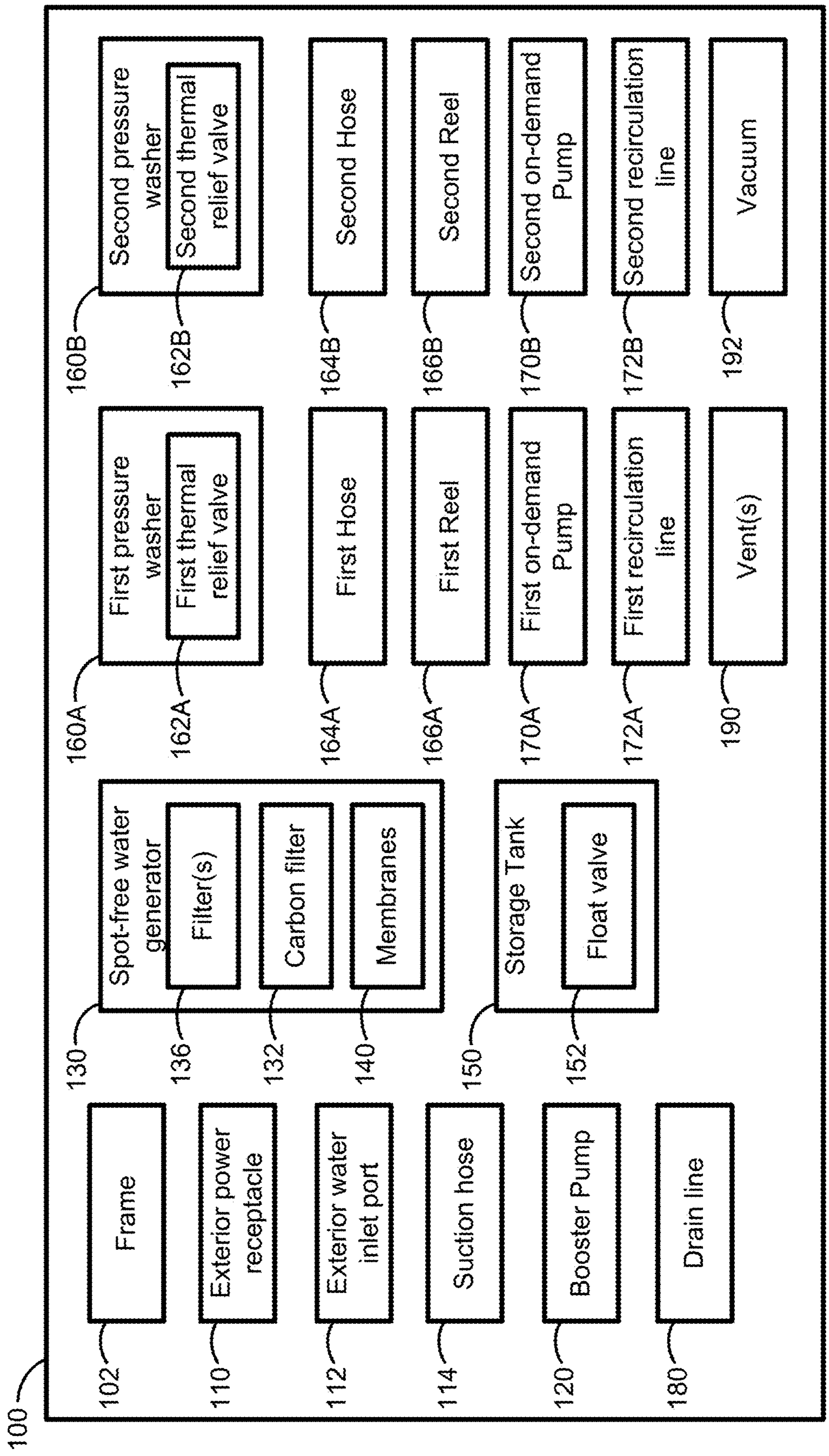
FIG. 1 is a functional block diagram of a mobile washing system, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Mobile detailing services generally involve a user or operator traveling with equipment to a location with vehicle(s) (e.g., cars, trucks, commercial vehicles, aviation vehicles, etc.) to be cleaned, instead of bringing the vehicle(s) to a car wash or other facility. Often times, a plurality of vehicles (e.g., a fleet of vehicles) will be serviced or cleaned in a single cleaning or detailing session. It is important for mobile detailing service providers to be able to clean vehicles quickly and efficiently.

Car washes often use spot-free rinse systems after cleaning vehicles to reduce the time required for drying. Tap water or well water will typically leave hard water spots on the vehicle if left to air dry, giving the vehicle an unclean appearance, even though it has just been cleaned. Further, these hard water spots can cause damages to the vehicle surface if left for long periods of time. Spot-free rinse water, on the other hand, does not leave hard water spots on the vehicle if left to air dry, and as such, spot-free rinse water can cut the drying time for a vehicle in half by reducing or eliminating the need to manually dry the vehicle (e.g., with towels, blowers, etc.). However, due to their size and complexity, the systems used by car washes to generate spot-free rinse water are typically stationary and cannot readily be moved from one location to another as required for mobile detailing services.

While certain filters may exist that purport to provide spot-free rinse water from a typical garden hose, such systems do not produce spot-free rinse water of the same quality as industrial (e.g., car wash) spot-free water systems. Nor do such systems provide a sufficient volume and/or pressure of water for mobile detailing services applications. As described herein, mobile detailing services typically use, among other things, a power washer to clean vehicles. While one could theoretically bring spot-free water from a source (e.g., a car wash) to another location in a tank, such an implementation is undesirable for a variety of reasons. As described above, mobile detailing services often clean many vehicles, which may require many dozens and up to hundreds of gallons of spot-free water. Such an implementation is highly undesirable as the operator would need to return to the source to obtain more spot-free water after expending whatever volume was initially stored in the tank. For example, if the operator has five jobs contracted for one day, the operator would likely need to return to the source of spot-free water multiple times (perhaps between each job), especially if each job involves multiple vehicles. As another example, if the tank runs out in the middle of a job, the operator would need to return to the source of spot-free water to obtain more spot-free water, then return to the job site.

Referring to FIG. 1, a system 100 according to some implementations of the present disclosure is illustrated. The system 100 includes a frame 102, an exterior power receptacle 110, an exterior water inlet port 112, a suction hose 114, a booster pump 120, a spot-free water generator 130, a water tank 150, a first pressure washer 160A, a second pressure washer 160B, a first hose 164A, a second hose 164B, a first on-demand pump 170A, a second on-demand pump 170B, a first recirculation line 172A, a second recirculation line 172B, a drain line 180, one or more vents 190, and a vacuum 192. Generally, the system 100 receives water (e.g., tap water) from an external water source via the exterior water inlet port 112, converts the received water to spot-free rinse water using the spot-free water generator 130, and delivers the spot-free rinse water via the first power washer 160A and/or the second power washer 160B, for example, to wash and/or detail a vehicle.

Figure 2:
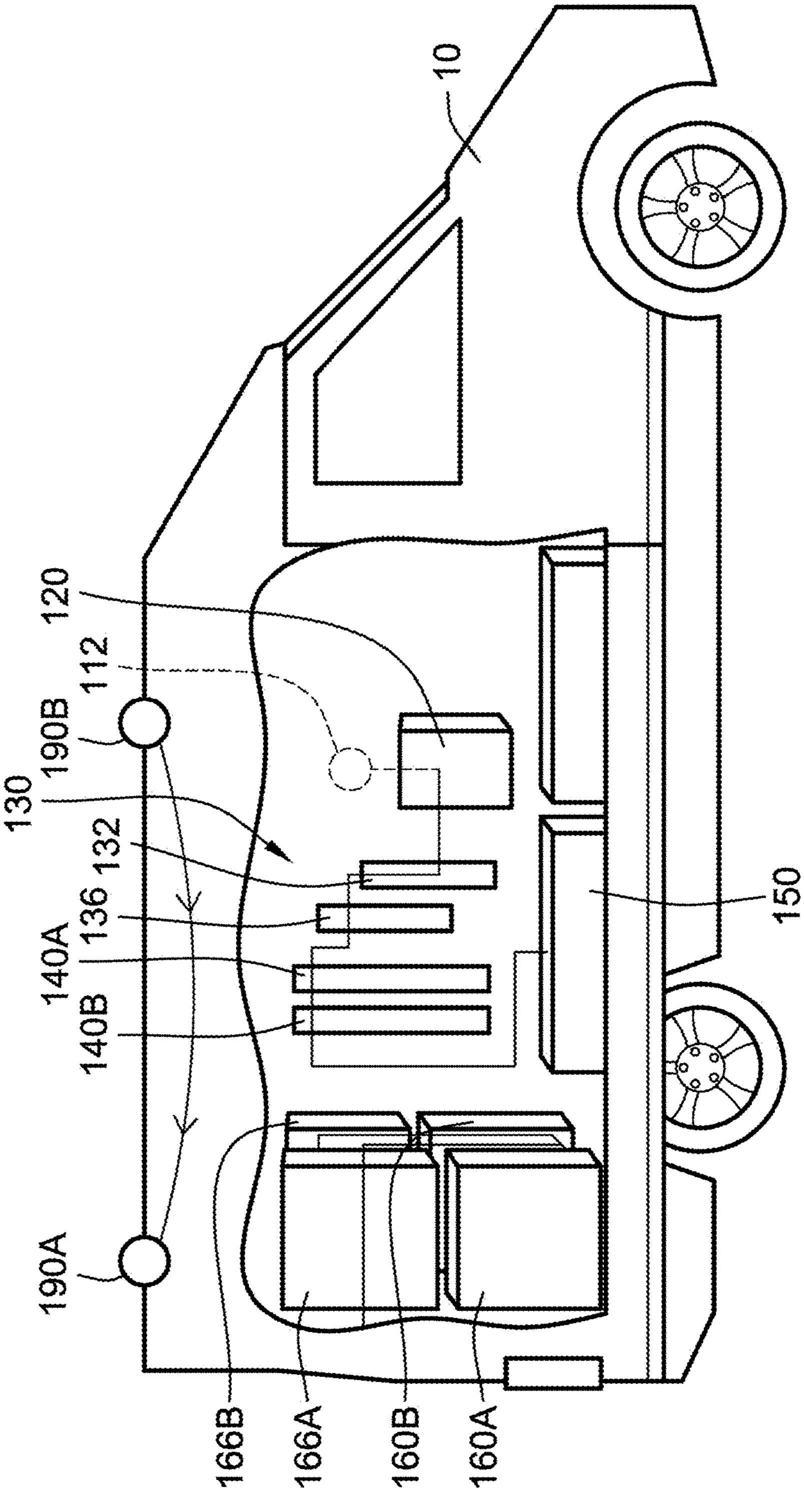
FIG. 2 is a schematic illustration of a portion of the system of FIG. 1, according to some implementations of the present disclosure.
Figure 3:
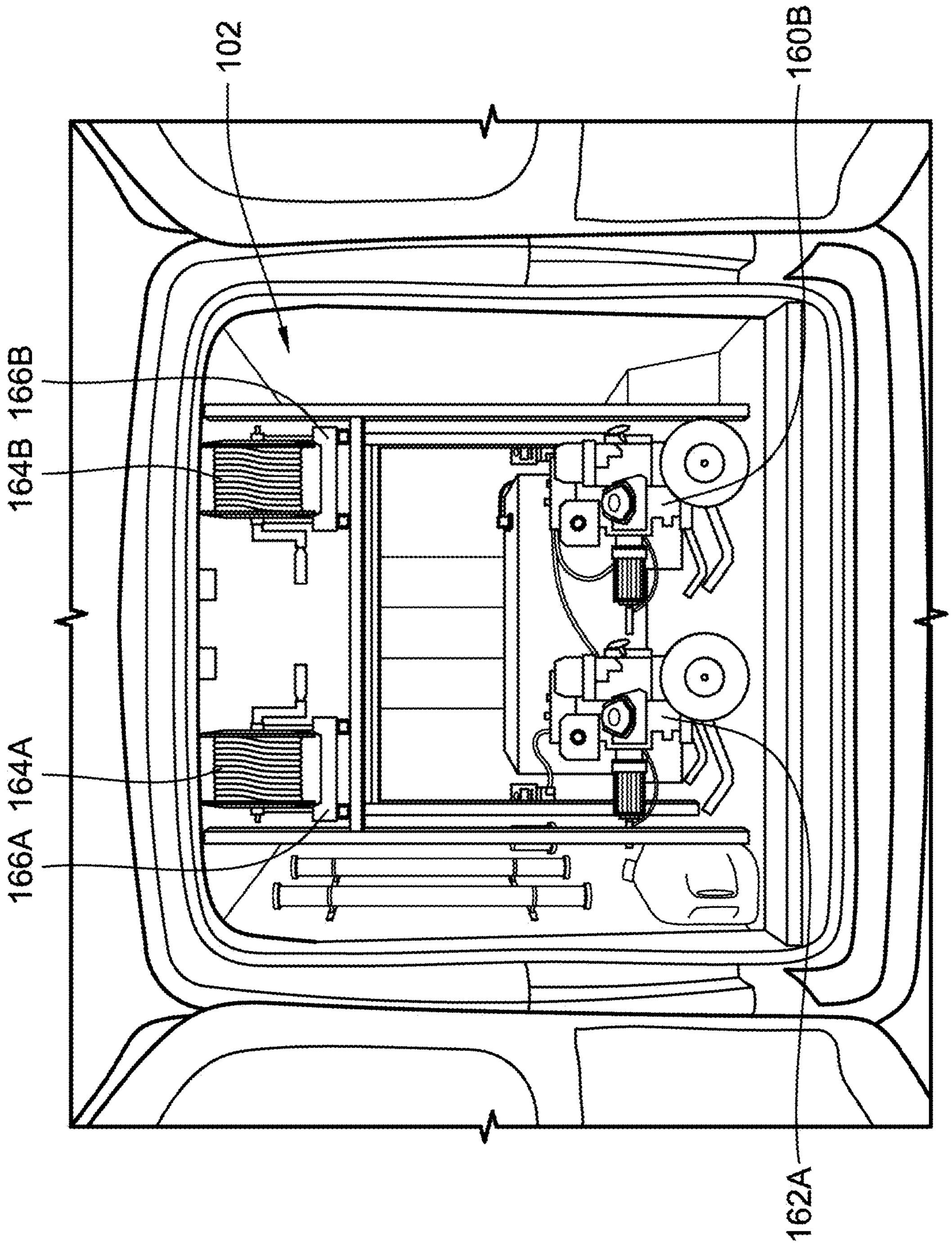
FIG. 3 is a perspective view of a portion of the system of FIG. 1, according to some implementations of the present disclosure.

Referring to FIGS. 2 and 3, one or more components or aspects of the system 100 can be physically coupled to and/or integrated in a vehicle 10 such that the system 100 is mobile. Generally, the vehicle 10 is moveable (e.g., from location A to location B) to transport the system 100. The vehicle 10 can be, for example, an enclosed trailer, a box truck, a semi-truck, an open trailer, a cargo work van, etc. In one non-limiting example, the vehicle 10 is a 250 MR Cargo Ford Transit vehicle. The vehicle 10 includes a power source (e.g., a battery). In some implementations, the power source of the vehicle 10 is used to power one or more of components or aspects of the system 100. For example, in some implementations, the power source of the vehicle 10 is used to power the first on-demand pump 170A and/or the second on-demand pump 170B described herein. In such implementations, the system 100 includes an inverter configured to convert power from the power source so that it is suitable for use by the first on-demand pump 170A and/or second on-demand pump 170B, and a toggle switch for turning the power on and off.

In other implementations, the system 100 can use an external power source (e.g., battery) to power one or more components of the system 100. The external power source can be separate and distinct from the power source of the vehicle. The external power source can be removable from the vehicle 10, for example, to charge the external power source (e.g., battery). In some examples, the external power source can be charged via one or more solar panels that are coupled to the vehicle. In such implementations including the external power source, the system 100 can further include an inverter configured to convert power from the power source so that it is suitable for use by the first on-demand pump 170A and/or second on-demand pump 170B, and a toggle switch for turning the power on and off.

Figure 4:
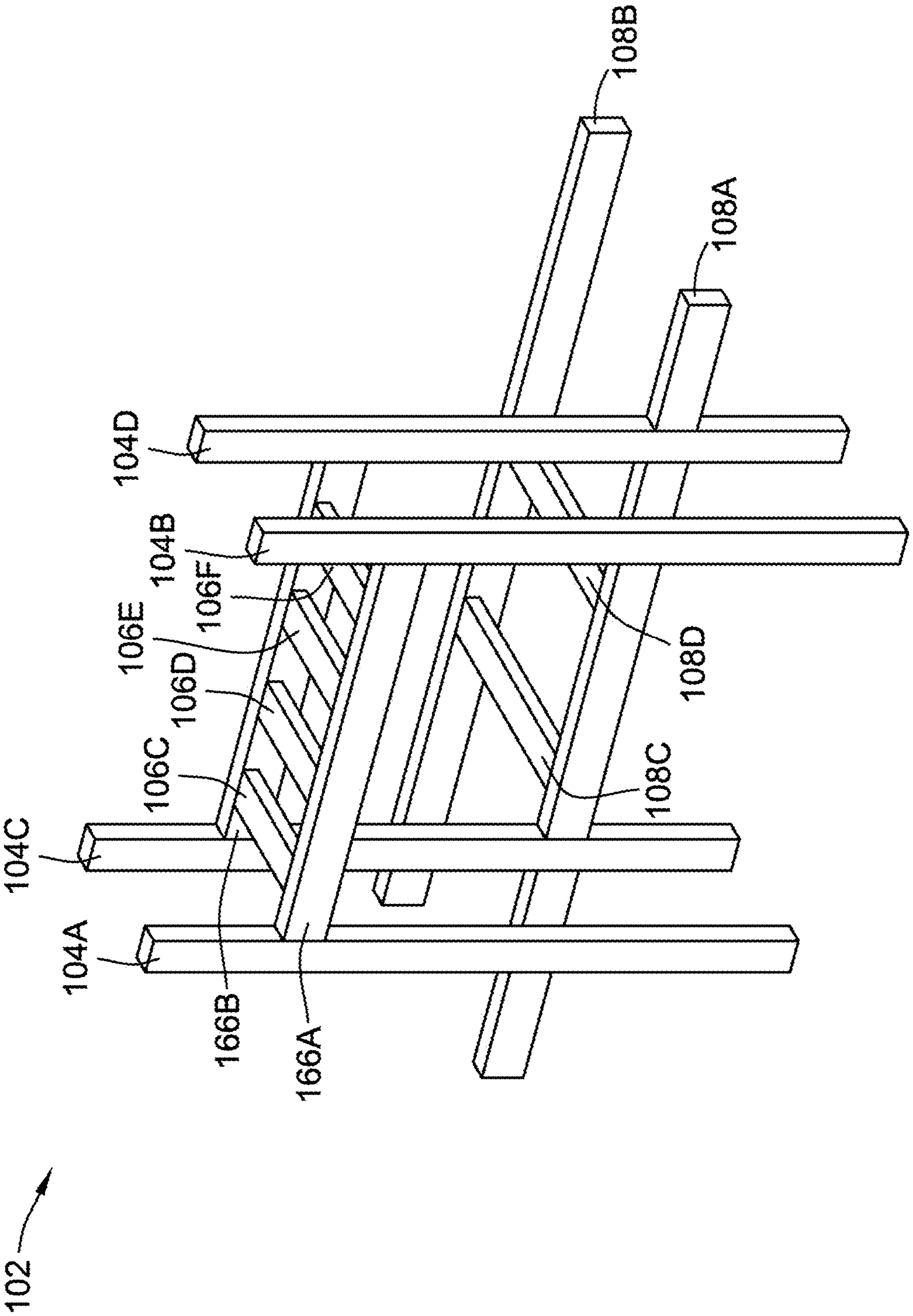
FIG. 4 is a perspective view of a frame of the system of FIG. 1, according to some implementations of the present disclosure.

The frame 102 is coupled to an interior portion of the vehicle 10 (e.g., attached to a frame of the vehicle 10) and is generally used to support components of the system 100. Referring to FIG. 4, the frame 102 includes a plurality of vertical support members 104A-104D, a first plurality of horizontal support members 106A-106F, and a second plurality of horizontal support members 108A-108D. Each of the plurality of vertical support members 104A-104D are coupled to a floor or base of the vehicle 10 (e.g., using one or more fasteners). Each of the plurality of vertical support members 104A-104D are also coupled to a roof or ceiling of the vehicle 10. The first plurality of horizontal support members 106A-106F are generally used to support the first reel 166A and the second reel 166B. The second plurality of support members 108A-108D are generally arranged to surround the tank 150 to aid in preventing the tank 150 from moving (e.g., when the vehicle 10 is in transit).

A first horizontal support member 106A is coupled to the first vertical support member 104A and the second vertical support member 104B (e.g., via one or more fasteners, via a welded connection, etc.). Similarly, a second horizontal support member 106B is coupled to the third vertical support member 104C and the fourth vertical support member 104D (e.g., via one or more fasteners, via a welded connection, etc.). Horizontal support members 106C and 106D are coupled between the first horizontal support member 106A and the second horizontal support member 106B and support the first reel 166A and the first hose 164A. Similarly, horizontal support members 106E and 106F are coupled between the first horizontal support member 106A and the second horizontal support member 106B and support the second reel 166B and the second hose 164B. Horizontal support member 108A is coupled to the third vertical support member 104C and the fourth vertical support member 104D and extends from one side wall of the vehicle 10 to the opposing side wall. Horizontal support member 108B also extends from extends from one side wall of the vehicle 10 to the opposing side wall and is coupled to the horizontal support member 108A via horizontal support members 108C and 108D.

Figure 5A:
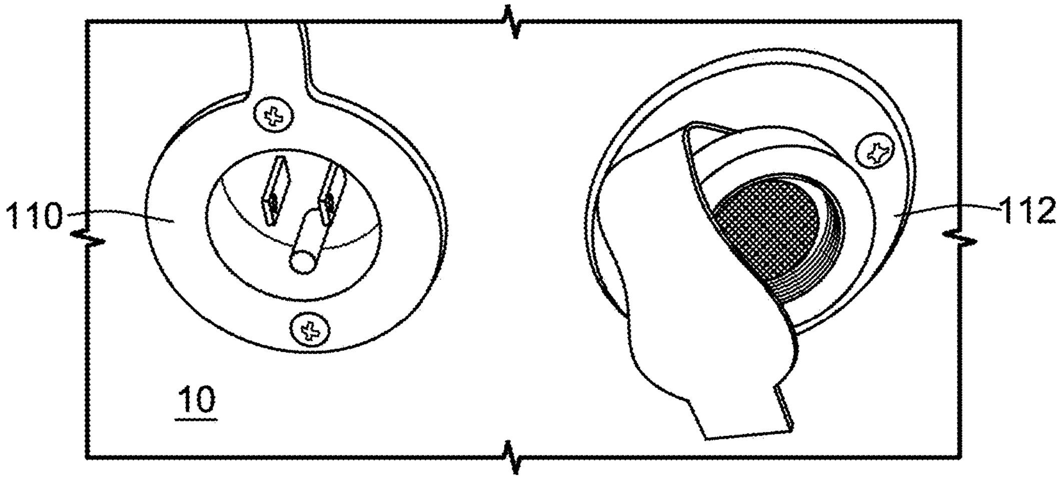
FIG. 5A is a perspective view of an exterior power receptacle and an exterior water inlet of the system of FIG. 1, according to some implementations of the present disclosure.

As described above, in some implementations, one or more of the components of the system 100 can be powered by the battery of the vehicle 10 (e.g., using a DC/AC converter). However, the power demands of these components may cause the battery of the vehicle 10 to rapidly drain if the vehicle 10 is not running. Running the vehicle 10 to charge the battery is undesirable as this burns fuel and creates additional emissions. To solve these problems, the exterior power receptacle 110 can be used to power one or more components of the system 100. Referring to FIG. 5A, the exterior power receptacle 110 can be positioned on an exterior of the vehicle 10 (e.g., a side panel) and extend into the interior of the vehicle 10. The exterior power receptacle 110 can also be referred to as a "shore power" outlet. The exterior power receptacle 110 includes a female multi-prong electrical socket that can engage a male multi-prong electrical socket, for example, from an extension cord. In turn, the extension cord can be plugged into a standard power outlet to power the components of the system 100. The exterior power receptacle 110 can be a 120-volt outlet or a 240-volt outlet, or any other suitable voltage outlet. Further, the exterior power receptacle 110 can include any suitable socket configuration (e.g., Type A, Type B, etc.) including, but limited to, a three-prong female socket (e.g., for receiving a ground prong) or a four-prong female socket (e.g., for receiving a ground prong and a neutral wire).

The exterior water inlet port 112 can also be positioned on the exterior of the vehicle 10 and extend into the interior of the vehicle 10, for example, as shown in FIG. 5A. The exterior water inlet port 112 is used to deliver water to the system 100, and more specifically, for use by the spot-free water generator 130, as described in further detail herein. In some implementations, the exterior water inlet port 112 is coupled to and receives water from the suction hose 114 (FIG. 1). In some implementations, the suction hose 114 is coupled to the exterior water inlet port 112 via a threaded connection. In turn, the suction hose 114 can be coupled to a standard hose spigot or faucet (e.g., on an exterior wall of a home or other building). In this manner, water from the hose spigot or faucet can be delivered to the portions of the system 100 positioned inside the vehicle 10.

Preferably, the suction hose 114 has a diameter of about 1 inch to aid in generating sufficient pressure and flow rate for the spot-free water generator 130, as described in further detail herein. More generally, the suction hose 114 can have a diameter between about 0.5 inches to 2 inches. Standard hose spigots or faucets typically have a diameter of about 0.75 inches. To accommodate standard spigots or faucets, in some implementations, the suction hose 114 has a diameter of about 1 inch and includes an adapter with a diameter of about 0.75 inches to couple the suction hose 114 between the spigot and the exterior water inlet port 112.

Positioning the exterior power receptacle 110 and the exterior water inlet port 112 on the exterior of the vehicle 10 is advantageous in that electrical power and/or water can be delivered to portions of the system 100 inside of the vehicle 10 without having to open the vehicle 10 (e.g., leave one or more doors open, run hoses or cords through a window, etc.). Thus, electrical power and/or water can be delivered to the system 100 without the presence of a user or operator while the vehicle 10 remains locked or otherwise secured.

Figure 5B:
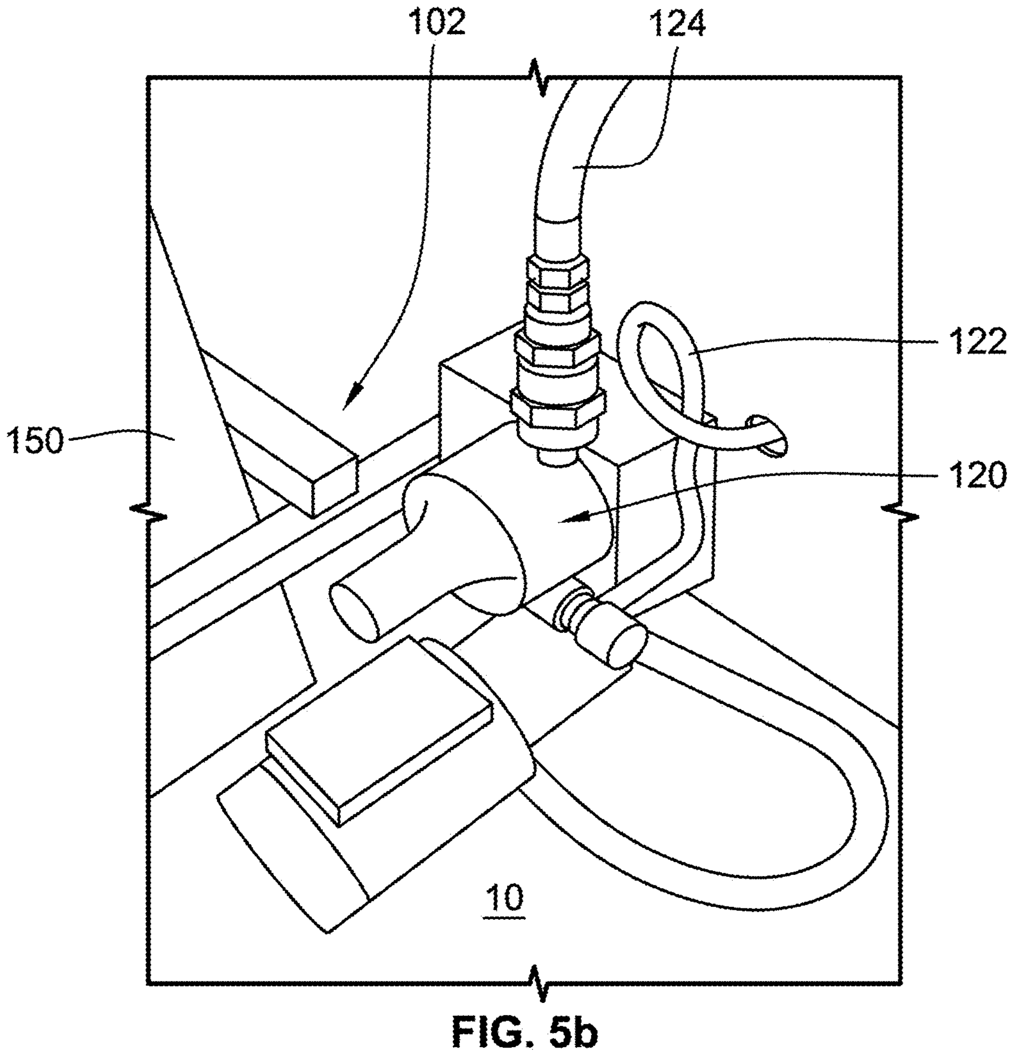
FIG. 5B is a perspective view of a booster pump of the system of FIG. 1, according to some implementations of the present disclosure.

Referring to FIG. 5B, water received by the exterior water inlet port 112 (FIG. 5A) is delivered to the booster pump 120 via a first feed line 122. As described above, the exterior water inlet port 112 receives water from a hose spigot or faucet (e.g., from a home or other building). Water from a typical hose spigot or faucet typically has a pressure between about 40 PSI and about 60 PSI. However, the membranes of the spot-free water generator 130 (described in further detail below) will either fail or lose their effectiveness unless the water has a pressure that is greater than 60 PSI. Thus, the booster pump 120 is fluidly coupled to and between the exterior water inlet port 112 and the spot-free water generator 130 and increases the pressure of the water to greater than 60 PSI prior to reaching the spot-free water generator 130. Increasing the water pressure is also advantageous because the total dissolved solids (TDS) is further reduced with increased pressure. The booster pump 130 delivers water with a pressure that is at least about 60 PSI via a second feed line 124. The first feed line 122 and the second feed line 124 can be, for example, a hose, a tube, a pipe, or any other suitable mechanism for fluidly coupling components.

In some implementations, the booster pump 120 has a power of about 0.75 horsepower, although lower or higher powers are also contemplated. In such implementations, the booster pump 120 can be powered via a 110-voltage power source (e.g., via the external power receptacle 110). Further, in such implementations, the suction hose 114 has a diameter that is between about 0.5 and about 0.75 inches. In other implementations, the booster pump 130 has a power that is greater than about 0.75 horsepower (e.g., about 1.5 horsepower). In such implementations, the booster pump 120 can be powered via a power source (e.g., via an external power receptacle 110) having a suitable rating (e.g., 110-volt, 120-volt, 220-volt, 240-volt, etc.). Further, in such implementations, the suction hose 114 is used because a typical garden hose would potentially collapse. In some non-limiting examples, the booster pump 120 is a Model No. C48C53A06 jet pump manufactured by Century and distributed by Gould's Water Technology. In some implementations, the system 100 does not include the booster pump, for example, if the pressure from the water source is sufficiently high to effectively run through the spot-free water generator 130.

Generally, the spot-free water generator 130 receives water (e.g., tap water) received by the exterior water inlet portion 112 and delivered by the booster pump 130 to generate spot-free rinse water. Spot-free rinse water is advantageous because unlike untreated tap water, it will not leave hard water spots or stains on surfaces (e.g., a vehicle that is being detailed), which can be caused by dissolved minerals such as calcium and magnesium, and does not need to be dried (e.g., by hand or blowers). Obviating the need to dry the vehicle after rinsing can cut the time for detailing a vehicle in half.

Figure 6:
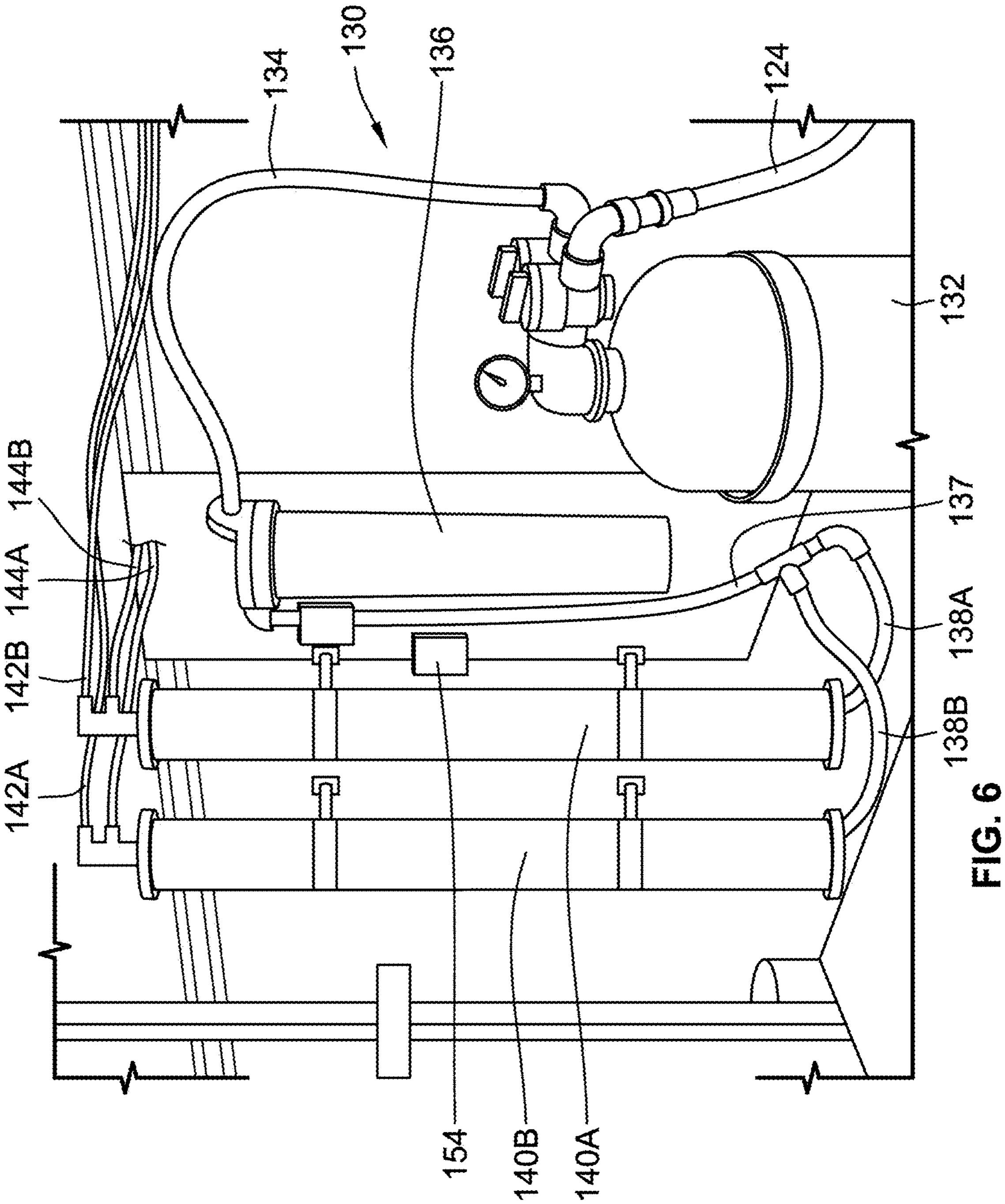
FIG. 6 is a perspective view of a spot-free water generator of the system of FIG. 1, according to some implementations of the present disclosure.

The spot-free water generator 130 includes a carbon filter 132, a pre-filter 136, a first membrane 140A, and a second membrane 140B. Referring to FIG. 6, the pre-filter 136 is downstream of the carbon filter 132, and the first membrane 140A and the second membrane 140B are downstream of the pre-filter 136. The carbon filter 132 delivers water to the pre-filter 136 via a first line 134. The pre-filter 136 subsequently delivers water to the first membrane 140A and the second membrane 140B via a second line 137. The second line 137 includes a first branch 138A for delivering a first portion of the water from the pre-filter 136 to the first membrane 140A and a second branch 138B for delivering a second portion of the water from the pre-filter 136 to the second membrane 140B. The first line 134 and the second line 137 (including the first branch 138A and the second branch 138B) can be a hose, a tube, a pipe, or the like, or any combination thereof. While the spot-free water generator 130 is shown as including the carbon filter 132, the pre-filter 136, the first membrane 140A, and the second membrane 140B, in other implementations, any suitable number and combination of these components can be included.

The carbon filter 132 receives water from the booster pump 120 via the second feed line 124. The water received from the booster pump 120 via the second feed line 124 typically contains chemicals such as chorine. The carbon filter 132 aids in filtering out these chemicals and other impurities prior to reaching the pre-filter 136, the first membrane 140A, and the second membrane 140B. The pre-filter 136 includes apertures for filtering impurities (e.g., sediments) in the water received by the spot-free rinse generator 130. Larger apertures filter less impurities than smaller apertures. Preferably, the pre-filter 136 has a 5-micron rating (e.g., removes impurities with a 5-micron diameter or greater) to avoid clogging and debris build up while still adequately filtering impurities. Generally, a lower micron rating of the pre-filter 136 will result in a lower TDS in the spot-free rinse water. In some implementations, the pre-filter 136 is a melt-blown filter cartridge is including a polypropylene melt-blown depth filter. While the spot-free water generator 130 is described herein as including two membranes (first membrane 140A and second membrane 140B), more generally, the spot-free water generator 120 can include any suitable number of membranes (e.g., four membranes). A suitable number of membranes generally relates to the power of the booster pump 120. For example, if the booster pump 120 have a power than it less than about 0.75 HP, having four membranes may not be suitable because the pressure will not reach 60 PSI. In some implementations, the membranes can be periodically rotated in and out of the spot-free generator 130 to increase the useful life of the membranes. In such implementations, one or more of the membranes can include a shut-off valve for rotating between which membrane is used during operation of the system.

In some implementations, the spot-free water generator 130 generates between about 1 gallon and 10 gallons of rinse water per minute, between about 3 gallons and 6 gallons of rinse water per minute, or about 4 gallons of rinse water per minute. Typically, the total dissolved solids (TDS) in water (e.g., chlorine, limestone, sulfur, etc.) from a standard hose spigot or faucet (e.g., tap water) is about 300 ppm or higher. The spot-free water generator 130 described herein can generate spot-free rinse water having a TDS that is about 15 ppm, between about 1 ppm and about 15 ppm, between about 5 ppm and about 10 ppm, or less than about 15 ppm. Preferably, the TDS of the spot-free rinse water generated by the spot-free water generator 130 is less than about 15 ppm.

Figure 7:
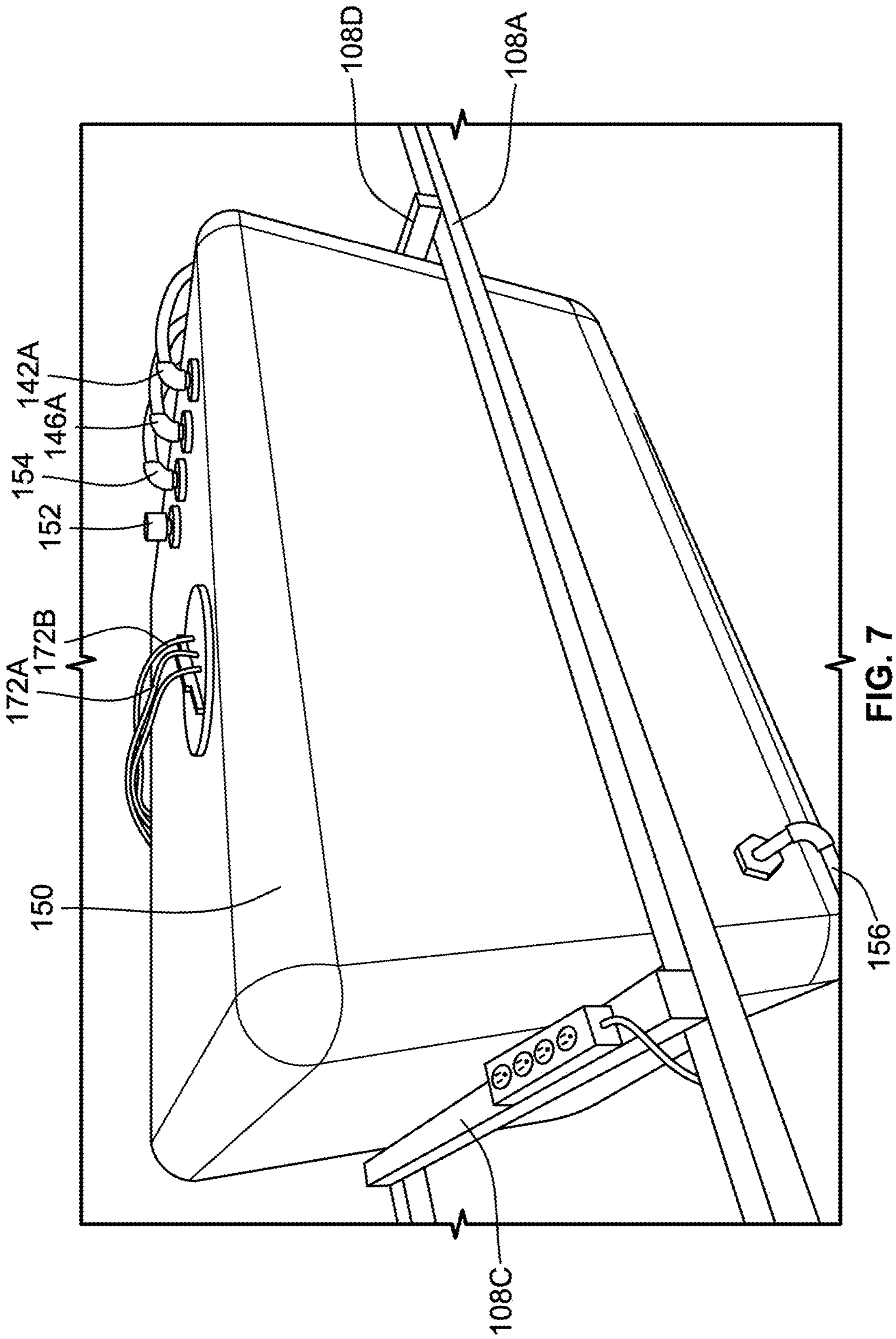
FIG. 7 is a perspective view of storage tank of the system of FIG. 1, according to some implementations of the present disclosure.

Still referring to FIG. 6, the spot-free water generator 130 includes a first spot-free water line 142A fluidly coupled to the first membrane 140A and a second spot-free water line 142B fluidly coupled to the second membrane 140B. The first spot-free water line 142A and the second spot-free water line 142B deliver spot-free rinse water from the spot-free water generator 130 to the storage tank 150 (FIG. 7). The spot-free water generator 130 also includes a first waste water line 144A fluidly coupled to the first membrane 140A and a second waste water line 144B fluidly coupled to the second membrane 140B. The spot-free water generator 130 does not convert all of the water received via the booster pump 130 into spot-free rinse water. The portion of the water received by the spot-free water generator 130 that is not converted to spot-free rinse water is waste water, and can be delivered to the drain line 180 by the first waste water line 144A and the second waste water line 144B to exit the system 100 and the vehicle 10.

Referring to FIG. 1, in some implementations, the spot-free generator 130 optionally includes a deionizer 146. The deionizer 146 removes total dissolved solids (TDS) from water using ion exchange resins, controlling the electric charge of ions in the water to lower the TDS in the water. Preferably, the deionizer 146 is only used when the TDS in the water exiting the spot-free generator 130 is greater than about 10. The TDS in the water generated by the spot-free generator 130 may depend on the TDS of the water delivered via the booster pump 120 (e.g., if the TDS in the source tap water is high, the TDS in water exiting the spot-free generator 130 may be higher). Thus, in some cases, depending on the TDS in the source water delivered via the booster pump 120, the deionizer 146 can further decrease the amount of TDS in the water generated by the spot-free water generator 130 (e.g., below about 10) to aid in achieving spot-free results.

The storage tank 150 receives and stores therein spot-free rinse water generated by the spot-free generator 130. Referring to FIG. 7, the storage tank 150 receives spot-free rinse water from the spot-free water generator 130 via the first spot-free water line 142A and the second spot-free water line 142B. The storage tank 150 can store between about 20 gallons and about 500 gallons of rinse water, between about 100 gallons and about 300 gallons of rinse water, about 200 gallons of rinse water, etc.

Referring back to FIGS. 3 and 4, for example, the storage tank 150 is coupled to the frame 102 and is positioned on a floor of the vehicle 10. Preferably, the storage tank 150 is positioned in generally the middle of the frame 102 to balance and evenly distribute weight. As best shown in FIG. 4, horizontal support members 108A-108D aid in inhibit movement of the storage tank 150 (e.g., when the vehicle 10 is in transit).

The storage tank 150 includes a float valve 152 and an actuator line 154. The float valve 152 controls the flow of spot-free rinse water into the storage tank 150. For example, in response to the storage tank 150 being filled with a predetermined volume of rinse water (e.g., at least 200 gallons of rinse water), the float valve 152 causes water to stop flowing into the storage tank 150 by moving between a first (e.g., open) position and a second (e.g., closed) position. More specifically, an actuator line 154 (FIG. 7) is communicatively coupled to a solenoid 156 (FIG. 6) that is configured to control (e.g., turn on and off) the spot-free water generator 130. Thus, advantageously, an operator of the system 100 can begin filling the storage tank 150, leave the vehicle 10, and not need to return and shut off the water to prevent the storage tank 150 from overflowing. Instead, the float valve 152 ensures that the storage tank 150 is filled with the desired volume of rinse water.

In some implementations, the storage tank 150 also includes a utility line 156. The utility line 156 can be used to deliver spot-free rinse water from the storage tank 150 for a variety of detailing applications, for example, filling up buckets or bottles including cleaning chemicals. When mixing chemicals with water for cleaning, it is advantageous to use spot-free rinse water as less chemicals are needed for cleaning compared to using regular tap water. Given the high pressures involved, it is impractical to fill buckets or bottles (e.g., spray bottles) with spot-free rinse water using one of the pressure washers. Accordingly, the utility line 156 can be used to obtain spot-free rinse water from the storage tank 150 for a variety of applications. The utility line 156 can be, for example, a hose (e.g., garden hose) and can include a valve for selectively allowing or inhibiting spot-free rinse water from flowing therethrough. The utility line 156 can also include a nozzle.

The first pressure washer 160A receives water from the storage tank 150 and is generally used to wash a vehicle or other object. The first pressure washer 160A provides a supply of pressurized water via the first hose **164*a* at a predetermined pressure. A predetermined pressure of about 2,100 PSI or less is typically considered suitable for cleaning vehicles (e.g., is not expected to damage an exterior of the vehicle), while higher pressures can be used in heavy-duty commercial implementations. The first pressure washer 160**A can deliver hot water or cold water depending on the application.

In some implementations, the first pressure washer 162A is a gas powered pressure washer. In other implementations, the first pressure washer 162A is an electric pressure washer, which can be advantageous in that the operator does not need to fuel the pressure washer with gas. In such implementations, the electric pressure washer can be powered via the shore power outlet 110, a battery or other power source, a trickle charger, or the like. As shown in FIG. 3, the first pressure washer 160A is coupled to the floor of the vehicle 10 and/or the frame 102. In the illustrated example, the first pressure washer 160A includes a set of wheels. While these the first pressure washer 160A is stationary by virtue of being coupled to the vehicle 10 and/or frame 102, the wheels can serve as dampeners (e.g., if the wheels are slightly deflated) to reduce vibrations from operating the pressure washer 160A.

The first hose 164*a* can be stored on the first reel 166A. The first reel 166A is coupled to the frame 102. As shown in FIGS. 3 and 4, the first reel 166A is coupled to horizontal support members 106C and 106D. The first pressure washer 160A can also include a wand or nozzle for aiding in directing water onto the vehicle(s) to be cleaned. Preferably, the nozzle is a 25-degree nozzle as this aids in cleaning and/or rinsing vehicle(s).

The second pressure washer 160B is the same as, or similar to, the first pressure washer 160A. Likewise, the second hose 164B and the second reel 166B are the same as, or similar to, the first hose 164A and the first reel 166A.

In a car wash facility, pressure washers are often supplied water via a gravity-fed system. However, as described above, the storage tank 150 is positioned on the floor of the vehicle 10. It would be undesirable to couple the storage tank 150 the roof of the vehicle 10 given the weight when filled (e.g., with 200 gallons of water). Generally, despite being located on the floor, when the storage tank 150 is full or substantially full (e.g., 90% full, 80% full, 66% full, etc.), the pressure is sufficient to feed the first pressure washer 160A and the second pressure washer 160B. However, as the storage tank 150 is emptied (e.g., during operation of the first pressure washer 160A and/or the second pressure washer 160B), the pressure is not high enough to feed the pressure washers (e.g., in examples where the pressure washers 160A-160B are a non-belt-driven pressure washers).

In such examples, the first on-demand pump 170A is fluidly coupled to the storage tank 150 (e.g., via a pipe, such as a PVC pipe) and the first pressure washer 160A (e.g., via a hose). The first on-demand pump 170A increases the pressure of the water exiting the storage tank 150 before reaching the first pressure washer 160A. The first on-demand pump 170A can be powered via the exterior power receptacle 110. In some implementations, the first on-demand pump 170A is manually actuated via a toggle switch. In some implementations, the first on-demand pump 170A generates a flow rate that is about 1 gallon per minute higher than the first pressure washer 160A. The second on-demand pump 170B is the same as or similar to the first on-demand pump 170A and is fluidly coupled to the storage tank 150 and the second pressure washer 160B. In some implementations, the first on-demand pump 170A is not needed if the pressure washer 160A is a belt-driven pressure washer.

During operation, pressure builds up in pressure washers when the operator is not spraying water using the wand or nozzle. Heated water built up in a pressure washer can cause undesirable overheating. For example, at water temperatures above about 145° F., seals within the pressure washer may fail. Referring to FIG. 8, the first pressure washer 160A includes a first thermal relief valve 162A to release water from the first pressure washer 160A when the water temperature or water pressure inside the first pressure washer 160A reaches a predetermined threshold. For example, if the first pressure washer 160A is on and the operator walks away to attend to other tasks (e.g., for a manner of minutes), the first thermal relief valve 162A will cause spot-free rinse water to drain from the first pressure washer 160A. The second pressure washer 160B includes a second thermal relief valve 162B that is the same as, or similar to, the first thermal relief valve 162A. Generally, there are two types of thermal relief valves. The first type is a resetting thermal valve including a disc that is moveable by a spring. When the water reaches a predetermined temperature, the spring opens and releases the water. When the water pressure temperature cools back down, the spring allows the disc to be closed. The second type of thermal relief valve does not have a spring-loaded disc. Instead, when the water reaches a predetermined temperature, the disc is lifted to release the hot water. When opened, the disc cannot close again unless urged back into its original position by back pressure from the attached recirculation line.

The spot-free rinse water drained by the first thermal relief valve 162A and/or the second thermal relief valve 162B may pool inside the vehicle 10 if not directed way from the system 100. Pooled water may cause rusting and/or corrosion of components of the vehicle 10 and/or the system 100. To avoid water pooling inside the vehicle 10 and to aid in reducing waste of the spot-free rinse water, the system 100 further includes a first recirculation line 172A fluidly coupled between the thermal relief valve 162A of the first pressure washer 160A and the storage tank 150. As shown in FIG. 7, the first recirculation line 172A delivers spot-free rinse water released from the thermal relief valve 162A back into the storage tank 150. Similarly, a second recirculation line 172B is fluidly coupled between the second thermal relief valve 162B of the second pressure washer 160B and the storage tank 150. The first recirculation line 172A and/or the second recirculation line 172B can be a hose, a tube, a pipe, or the like.

As described above, the pressure washers 160A-160B can be gas-powered pressure washers. In such implementations, the pressure washers create exhaust gases during operation. While the doors of the vehicle 10 are typically open when the pressure washers are operated, the exhaust gases can persist inside the vehicle 10 after the pressure washers are turned off and the doors are closed. Referring back to FIG. 1, in some implementations, the system 100 includes one or more vents 180 for aiding in preventing exhaust from building up inside the vehicle 10. The vents are coupled to or integrated in the vehicle 10 to allow exhaust gases from the pressure washers to escape the interior of the vehicle. The exhaust vents can be positioned on, for example, a roof of the vehicle 10, a side of the vehicle 10, the floor of the vehicle 10, or any other suitable location. Preferably, the exhaust vent(s) are positioned on a roof of the vehicle 10. For example, referring to FIG. 2, the system 100 can include a first vent 180A and a second vent 180B. The first vent 180A and the second vent 180B can be positioned to face in opposite directions, for example, such that when the vehicle 10 is moving in the forward direction, air flows into the interior through the first vent 180A and exits through the second vent 180B, thereby aiding in expelling exhaust gases from the interior of the vehicle 10. In some implementations, one or more fans can be used to further aid in causing exhaust gas to escape the interior of the vehicle. These fans can be powered by, for example, the vehicle power source.

Generally, the drain line 180 removes water from the system 100, including waste water. The drain line 180 can be fluidly coupled to the storage tank 150, for example, so as to permit an operator to drain the storage tank 150. The drain line 180 can also be fluidly coupled to the spot-free water generator 130. The spot-free water generator 130 generates both spot-free rinse water and waste water (e.g., less than 100% of the tap water received by the spot-free generator 130 is converted to spot-free rinse water). Thus, the drain line 180 can remove waste water produced by the spot-free water generator 130. To remove water from the system 100 and the vehicle 10, the drain line 180 can extend through the floor of the vehicle 10 so that the water can drain underneath the vehicle 10. In some implementations, the drain line 180 can be coupled to a hose to direct the water away from underneath the vehicle 10 (e.g., towards a sewer).

The vacuum 192 is used to vacuum the vehicle that is being detailed. The vacuum 192 can be coupled to the frame 102 and/or the vehicle 10 and can be powered via the external power receptacle 110 described herein. Alternatively, the vacuum 192 can be powered via the battery of the vehicle 10. In some implementations, the system 100 also includes one or more power strips that are coupled to the frame 102 for powering, for example, handheld detailing tools. These power strips can be electrically coupled to the inverter (coupled to the vehicle battery or another power source) described above or the shore power delivered via the exterior power receptacle 110.

In some implementations, the vehicle 10 includes lining (e.g., raptor lining, line-x lining, etc.) on a floor of the interior (e.g., covering substantially all of the floor or at least a portion thereof) and at least a portion of one of more side walls of the interior of the vehicle 10 (e.g., lining extending along the side walls from the floor to between about 1 foot and 2 feet from the floor). The lining aids in creating a generally water-tight environment inside the interior of the vehicle 10 to prevent water leakage from the system 100 from rusting or corroding components (e.g., metal) of the vehicle 10. Additionally, in some implementations, a plurality of small holes (e.g. having a diameter less than 1 inch, less than 0.5 inches, less than 0.25 inches, etc.) are drilled in the floor of the vehicle 10 (e.g., every 3 feet, every 6 feet, every 10 feet, etc.) to cause any pooling water from the system 100 to drain to the exterior of the vehicle. These holes can further aid in preventing or reducing rusting or corrosion due to standing water inside the vehicle 10.

While the system 100 is shown as including all of the components described above, more or fewer components can be included in a system according to implementations of the present disclosure. For example, a first alternative system includes the spot-free water generator 130, the booster pump 120, the storage tank 150, the first pressure washer 160A, the first on-demand pump 70A, the first reel 166A, and the first hose 164A. Thus, various systems can be formed using any portion or portions of the components shown and described herein and/or in combination with one or more other components.

In some implementations, the system 100 further includes a control system including one or more processors and a memory device. In such implementations, the control system can be used to control (e.g., actuate) the various components of the system 100. The processor(s) can be a general or special purpose processor or microprocessor. The memory device stores machine-readable instructions that are executable by the processor of the control system. The memory device can be any suitable computer readable storage device or media, such as, for example, a random or serial access memory device, a hard drive, a solid state drive, a flash memory device, etc.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A system comprising:

a frame;

a spot-free water generator configured to generate spot-free rinse water from tap water, the spot-free water generator including a carbon filter, a pre-filter, and a plurality of membranes, wherein the pre-filter is positioned downstream of the carbon filter and the plurality of membranes are positioned downstream of the pre-filter and one or more of the carbon filter, the pre-filter, and the plurality of membranes are coupled to the frame;

a booster pump configured to receive tap water from an exterior water source and deliver the tap water to the spot-free water generator at a predetermined pressure; and a storage tank coupled to the frame and being configured to receive and store at least a portion of the spot-free rinse water generated by the spot-free water generator, wherein the storage tank includes a float valve configured to move between a first position towards a second position responsive to a predetermined volume of spot-free rinse water being stored in the storage tank to cause the spot-free water generator to stop generating spot-free rinse water.

2. The system of claim 1, further comprising an on-demand pump coupled to the frame, the on-demand pump being configured to deliver spot-free rinse water from the storage tank to a pressure washer.

3. The system of claim 2, wherein the system includes the pressure washer.

4. The system of claim 3, further comprising a recirculation line fluidly coupled between the pressure washer and the tank, the recirculation line being configured to deliver spot-free rinse water released from a pressure relief valve of the pressure washer to the storage tank.

5. The system of claim 1, further comprising a hose reel coupled to the frame and a hose fluidly coupled to the storage tank.

6. The system of claim 5, further comprising a pressure washer fluidly coupled to the storage tank via the hose.

7. The system of claim 1, wherein the predetermined pressure of the tap water delivered to the spot-free water generator is greater than 60 PSI.

8. The system of claim 7, wherein the spot-free water generator is configured to generate at least 2 gallons of spot-free rinse water per minute.

9. The system of claim 1, wherein the carbon filter is configured to aid in filtering chemicals from the tap water.

10. The system of claim 9, wherein the pre-filter includes apertures configured to filter impurities from the tap water.

11. The system of claim 1, wherein the spot-free rinse water has a total dissolved solids (TDS) concentration that is between 1 ppm and 15 ppm.

12. The system of claim 1, wherein the spot-free rinse water has a total dissolved solids (TDS) concentration that is less than 15 ppm.

13. The system of claim 1, wherein the plurality of membranes includes at least four membranes.

14. The system of claim 1, wherein the tank is configured to store at least 200 gallons of spot-free rinse water.

15. The system of claim 1, further comprising a suction hose configured to deliver tap water from a spigot or faucet to the spot-free water generator.

16. The system of claim 15, wherein the suction hose has a diameter of 1 inch.

17. The system of claim 15, wherein the suction hose includes an adapter configured to be coupled to a tap water source.

18. The system of claim 1, wherein the frame is configured to be received within and coupled to a portion of an interior of a vehicle.

19. The system of claim 1, further comprising a solenoid configured to control the output of the spot-free water generator.

20. The system of claim 19, wherein the solenoid is configured to turn off the spot-free water generator responsive to the float valve moving to the second position and to turn on the spot-free water generator responsive to the float valve moving from the second position towards the first position.

* * * * *